(No Model.) 2 Sheets—Sheet 1.
A. WICKEY.
BALING PRESS.
No. 497,039. Patented May 9, 1893.
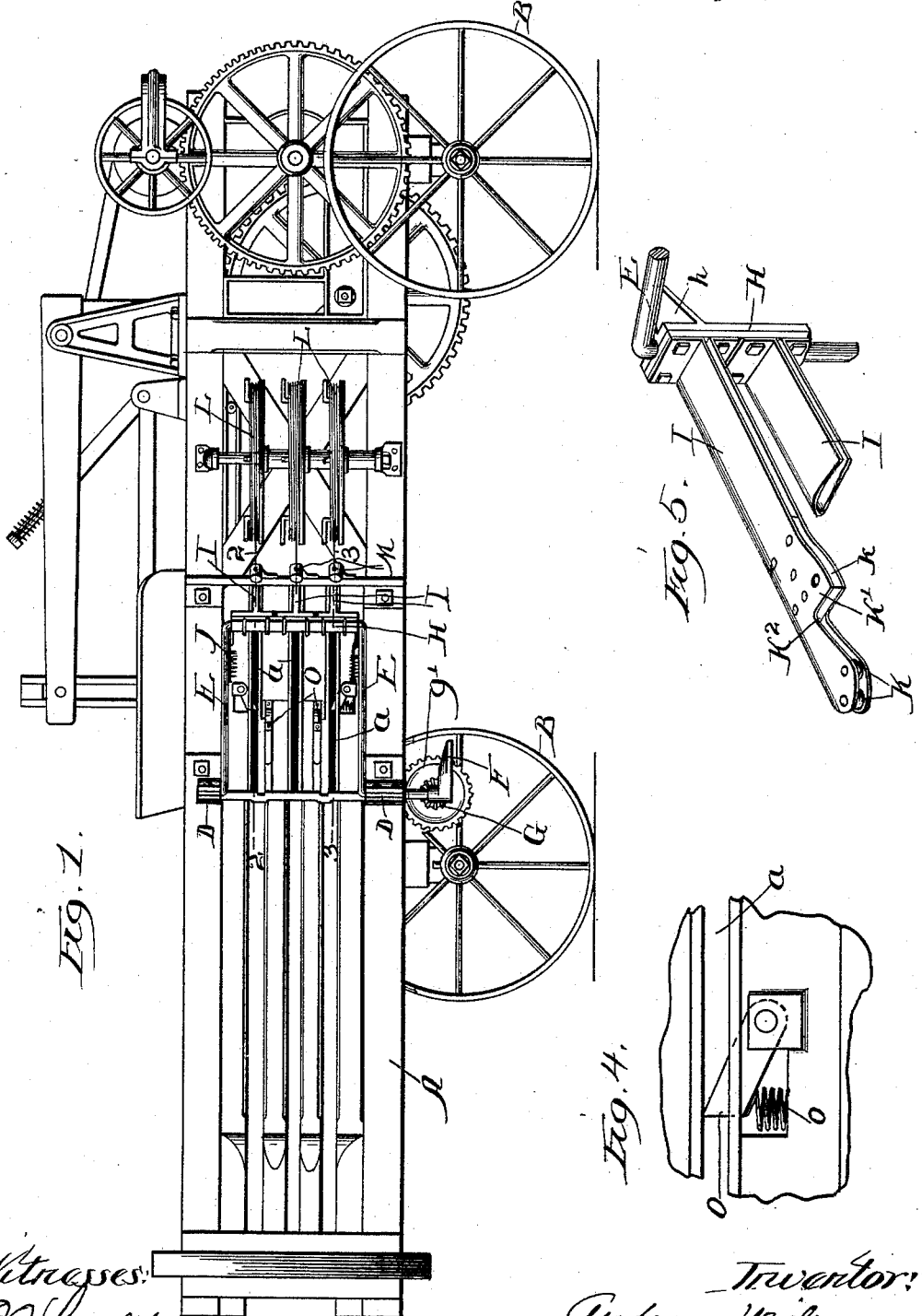

(No Model.) 2 Sheets—Sheet 2.
A. WICKEY.
BALING PRESS.
No. 497,039. Patented May 9, 1893.
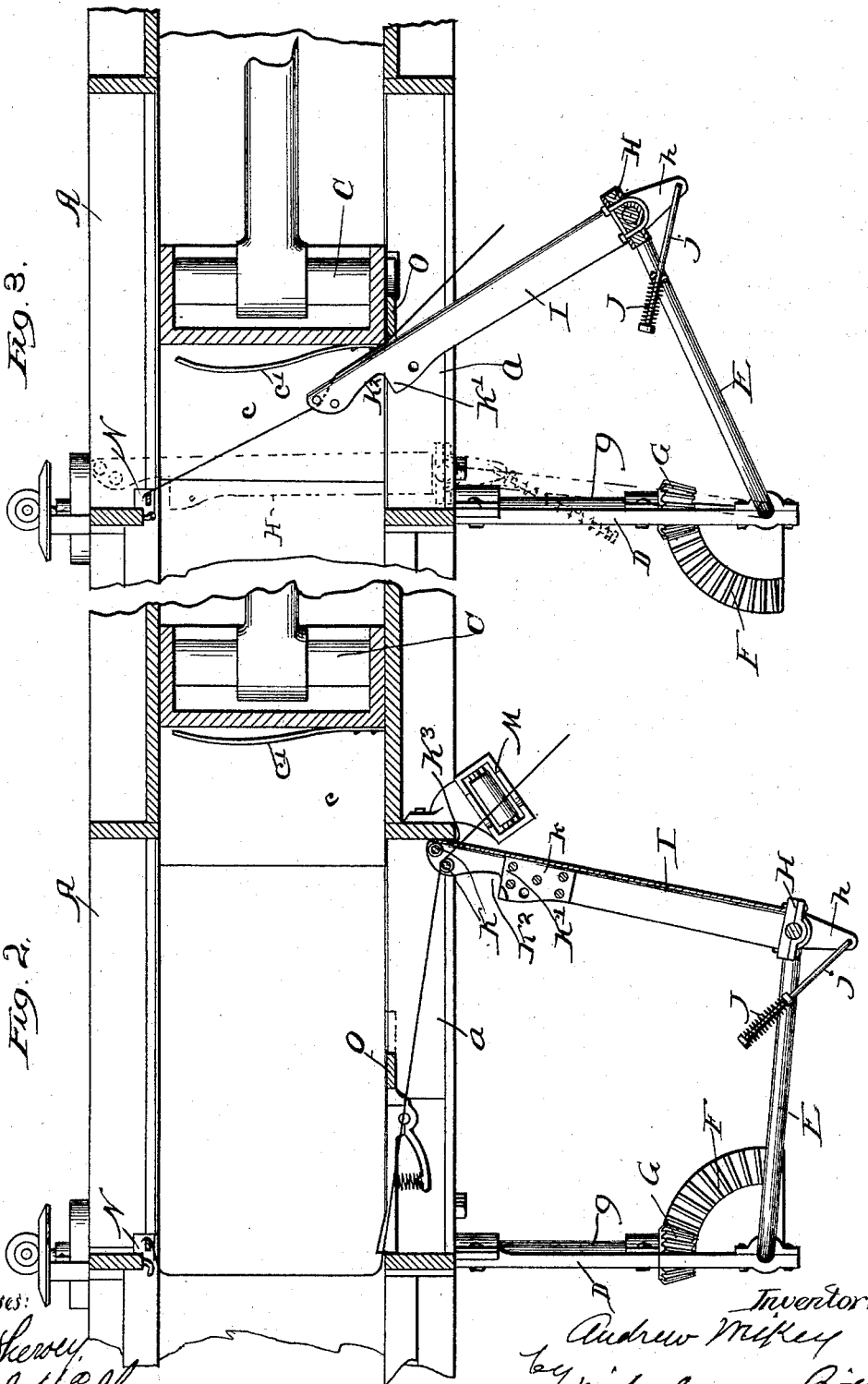
Witnesses:
Inventor:
Andrew Wickey

UNITED STATES PATENT OFFICE.

ANDREW WICKEY, OF CHICAGO, ILLINOIS.

BALING-PRESS.

SPECIFICATION forming part of Letters Patent No. 497,039, dated May 9, 1893.

Application filed August 22, 1892. Serial No. 443,810. (No model.)

*To all whom it may concern:*

Be it known that I, ANDREW WICKEY, a citizen of the United States of America, residing at Chicago, in the county of Cook and State of Illinois, have invented certain new and useful Improvements in Baling-Presses, of which the following is a specification.

My invention relates to certain improvements in baling presses known as self tyers, and are directed particularly to that part of the mechanism which has to do with the insertion of the wire by means of which the bales are tied between said bales and in position to be operated upon by the tying mechanism. There are certain requirements to be met by an automatic bale tying apparatus which is expected to tie the bales while the press is in continuous operation, that have given great difficulty to inventors in this line. The bales must be tied at the instant when the plunger is at the extreme limit of its motion toward the bale chamber, and yet it is impracticable to give the plunger sufficient dwell at this point to enable the whole operation of inserting the wire to be accomplished after it has reached the end of its stroke. Hence it is desirable that the wire-inserting devices should commence to move before the plunger completes its stroke. At the same time it is obvious that said devices must work in such a manner that they will intercept none of the hay pressed forward by the plunger. It is especially with a view to these difficulties that the present invention has been brought forth, and, at the same time, in their solution certain incidental improvements have been made in the way of arrangement and construction which will be fully understood from the following description.

In the drawings presented, Figure 1 is a side view of a complete baling press. Fig. 2 is a partial horizontal section looking downward in line 2—2, of Fig. 1. Fig. 3 is a partial horizontal section, also looking downward, in line 3—3, of Fig. 1, and showing some of the parts in a different position from Fig. 2. Fig. 4 is an enlarged detail view; and Fig. 5 is a detail perspective.

Lettering the frame of the press A, the wheel B, and the plunger C, Figs. 2 and 3 show horizontal slots $c$, in the latter, and Fig. 1 shows corresponding slots $a$, in the side of the compression chamber. Extending out from the frame at D, are lateral arms having pivoted at their outer ends a double crank E, bearing upon its lower extremity a segment F, in gear with a pinion G, upon a shaft $g$, rotated by means of a gear $g'$, operated at the proper time by suitable connections with the driving mechanism. The motion of the crank is from the position seen in Fig. 2, to that shown in dotted lines in Fig. 3, and said crank carries at H, a box to which are fastened three needles I, drawn to the right by means of a spring J, applied by means of a rod $j$, to an extension $h$, of the box H. The needles I, are preferably formed of steel plate bent upon itself in the form of letter U as seen in Fig. 5. Said needle has at its free end two rollers K, and at a short distance therefrom a shoulder K', formed by a block $k$, riveted between the two plates of the needle. Between this shoulder and the rollers is a notch $K^2$, and upon the rear or convex side of the needle is a hole $K^3$. The wire is held upon reels L, at the side of the machine, passing from them through boxes M, in which it is oiled and straightened, thence through the hole $K^3$, between the rollers K, and from them around the forward end of the bale and back to the tying devices N. It is not thought necessary to illustrate in full these tying devices for the reason that there are large numbers of such devices which would answer the purpose of the present invention already well known in the art.

When the plunger C, starts upon the final stroke which is to complete a bale, the needles I, start inward through the slots $a$, and entering the slots $c$, in the plunger are pressed by the springs J, against springs $c'$, at the inner ends of the slots. As the plunger proceeds the crank E, swings in toward the press and the needles I, advance bodily toward the position shown in dotted lines in Fig. 3, being held by the springs J, $c$, in the proper position to present the wire to the tying devices which grasp it between the rollers K, and the shoulder $k$. As the needles have traveled forward they have passed over dogs O, pressed upward by means of springs $o$, and blocking any movement of the needles toward the right in the slot, but allowing them to move toward the left by merely sliding over the inclined sides of the dogs and forcing them out of the way against the tension of the springs. When, now, the withdrawal of the needles commences, the dogs O, are encountered and compel them to take a different path from the one described in their advance. This is for the purpose of stretching the wire which is to encircle the forward end of the next bale straight across the bale chamber out of the way of the incoming hay. As soon however as the points of the needles pass the dogs O, they are thrown into the positions seen in Fig. 2, by the springs J.

The principal advantages of my invention are the peculiar movement imparted to the needles by the crank connection E, and the simple and strong construction of the needle itself. It will be noticed that the operation of the needle by means of a crank pivoted to the end of a laterally extending arm gives the butt end of the needle a combined inward and forward movement which enables it to follow the motion of the plunger as it moves toward the bale chamber.

It is, of course, obvious that great variation is possible in the precise construction, and I do not desire to confine myself further than as closely pointed out in the appended claims.

I claim as new and desire to secure by Letters Patent—

1. The combination with a baling press having suitable tying devices, of a lateral arm secured to the frame and projecting outward some distance therefrom, a crank pivoted to the end of said arm and arranged to swing toward the same in the tying operation, suitable connections between the said crank and the driving mechanism for oscillating it upon its pivot at the proper moment, a wire-inserting needle pivoted to the end of the crank, suitable openings in the frame of the press to allow said needle to pass through, and guiding devices to carry the needle to the tying mechanism; substantially as described.

2. The combination in a baling press provided with suitable tying mechanism, of a laterally extending arm secured to the frame, a crank pivoted to the end of this arm and having suitable connections with the driving mechanism, a series of needles pivoted to the free end of the crank and provided with the springs J, suitable openings in the sides of the press to allow the needles to be inserted therein and a slotted plunger provided with the springs $c'$; substantially as described.

3. The combination in a baling press provided with suitable tying devices and having slots in the sides thereof, of a laterally extending arm D, secured to the frame, a crank E, pivoted at the extremity of said arm and oscillated by means of suitable connections with the driving mechanism, a series of needles I, pivoted to the free end of the crank and provided with a spring J, tending to throw them away from the tying devices, a slotted plunger C, provided with the springs $c'$, arranged to oppose the spring J, and a series of dogs O, arranged to allow the needles to pass over them in their forward movement, but to intercept them upon their return; substantially as described.

4. In a self-tying baling press and in combination with suitable driving, feeding and tying devices, a wire-inserting needle suitably mounted, said needle being formed by bending a metal plate upon itself in the shape of a letter U in cross-section and providing between the sides thereof suitable devices for spacing the latter apart and for guiding the wire therein.

5. In a self-tying baling press and in combination with suitable driving, feeding and tying devices, a wire-inserting needle formed by bending a metal plate upon itself in the shape of a letter U in cross-section and having the rollers, K, the shoulder, K', and the opening, $K^3$, through the back of the needle; substantially as described.

6. The combination with the frame of a baling press provided with a tying device and a slot in its side extending substantially the full length of the compression chamber, of a plunger slotted in the same plane as the frame and provided with suitable driving mechanism a wire-inserting needle mounted upon the frame in the plane of said slots, and movable both longitudinally and laterally of the frame, connecting gear between the needle and the driving mechanism of the press for thrusting the needle into the slots and withdrawing it therefrom, a tripping device to start the needle inward at substantially the commencement of the forward stroke of the plunger and reversing mechanism to withdraw the needle when the tie is made; substantially as described.

ANDREW WICKEY.

Witnesses:
CHAS. O. SHERVEY,
A. I. H. EBBESEN.